United States Patent [19]

Tieben

[11] 3,892,203
[45] July 1, 1975

[54] HEADGATE
[76] Inventor: James B. Tieben, 106 Cottonwood, Dodge City, Kans. 67801
[22] Filed: July 30, 1973
[21] Appl. No.: 383,830

[52] U.S. Cl. ................................................ 119/99
[51] Int. Cl. ............................................. A61d 3/00
[58] Field of Search ............... 119/98, 99, 103, 141

[56] References Cited
UNITED STATES PATENTS

| | | | |
|---|---|---|---|
| 1,114,094 | 10/1914 | Apple | 119/99 |
| 2,587,160 | 2/1952 | Howe | 119/99 |
| 3,221,707 | 12/1965 | Pearson | 119/98 |
| 3,229,666 | 1/1966 | Sedevie | 119/98 |
| 3,691,998 | 9/1972 | Luinstra | 119/98 |

*Primary Examiner*—Louis G. Mancene
*Assistant Examiner*—J. N. Eskovitz
*Attorney, Agent, or Firm*—Hume, Clement, Brinks, Willian, Olds and Cook, Ltd.

[57] ABSTRACT

An improved headgate is provided with a self-tightening head restraint mechanism and a device to aid in automatic closure when the headgate is used with longhorned animals.

7 Claims, 5 Drawing Figures

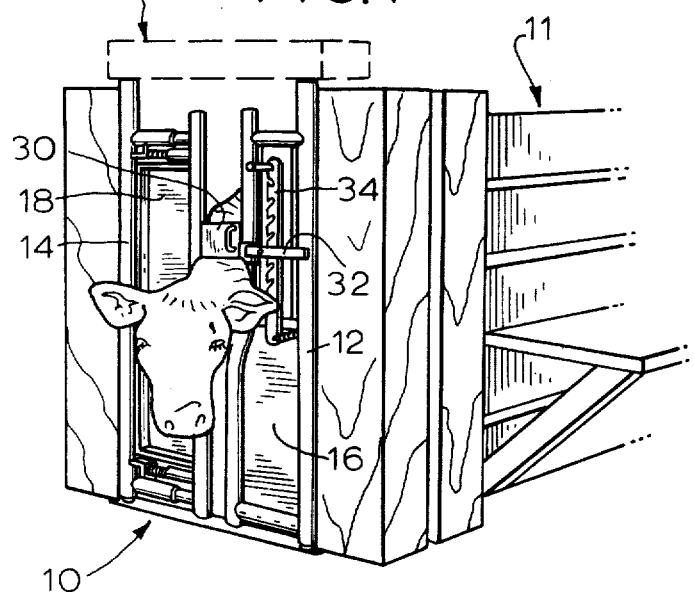
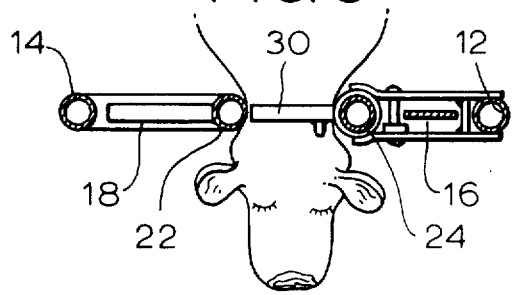
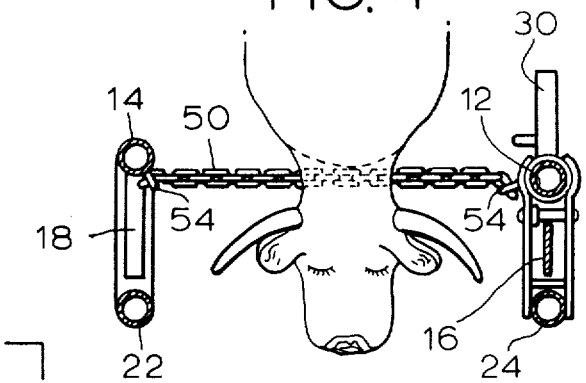
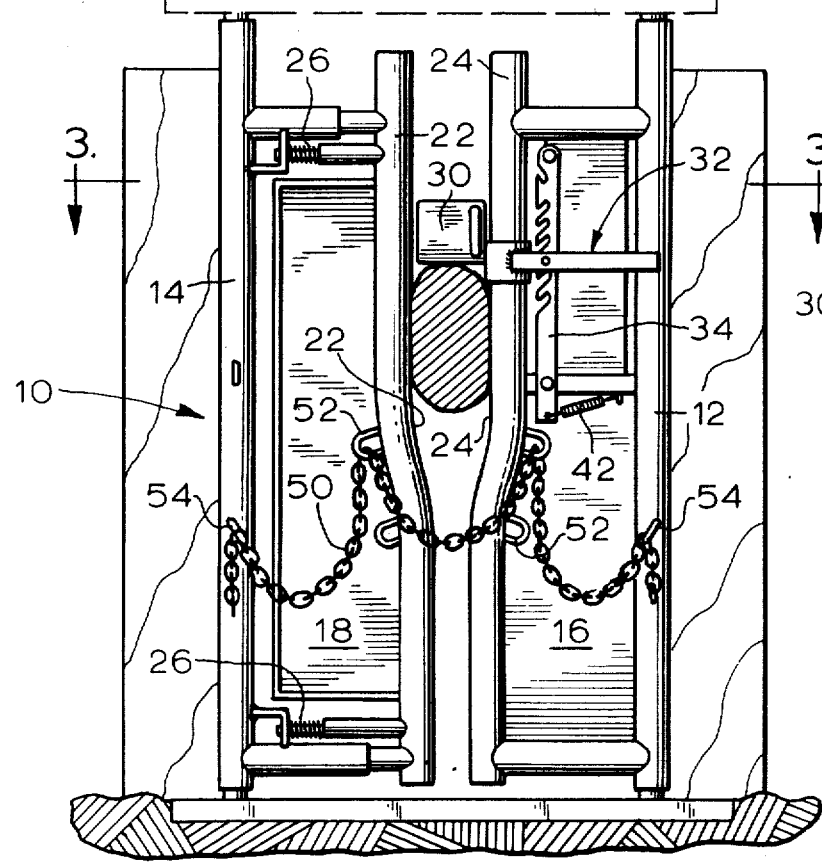
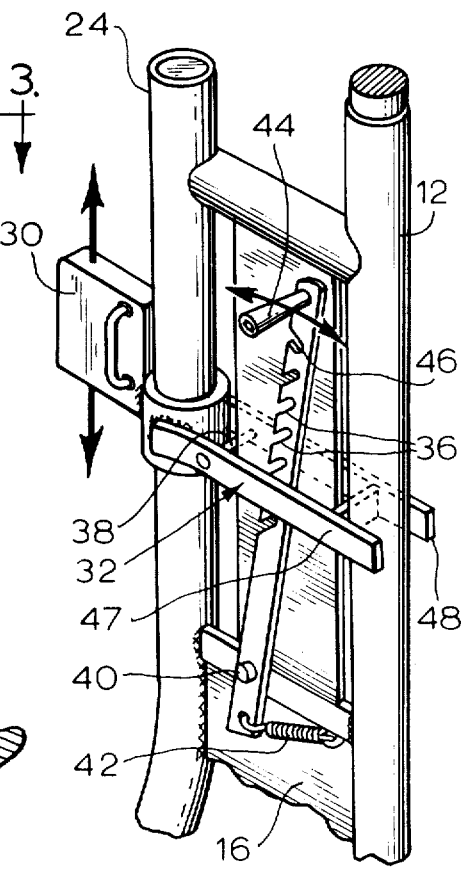

HEADGATE

BACKGROUND AND SUMMARY OF THE INVENTION

This invention relates generally to apparatus for the handling of animals and, more specifically, to an improved livestock headgate.

In the handling of livestock, such as cattle, it is often necessary to confine the animal for inspection, medical treatments, and the like. Livestock headgates are used for such a purpose. They must be rugged in construction, but be easily operated in the locking and releasing actions. It is also valuable if the headgates are capable of restraining the animal's head from vertical movements in such operations as dehorning.

It is known that headgates have been provided in the past with head restraining devices. See, for example, U.S. Pat. Nos. 3,221,707; 3,513,812 and 3,691,998. However, these known devices possess several disadvantages including the need for the operator to position and tighten the restraint by hand. Furthermore, before the animal can be released from the headgate it is necessary for the operator to release and remove the restraint since typically the restraint interferes with the disengaging action of the headgate.

Automatic headgate devices are also known in the art. Typically, as is shown in U.S. Pat. No. 3,691,998, these consist of two pivotal gates which are preset in an open position. When the animal attempts to pass through the open gates its shoulders engage the outer edges of the gates which then swing and lock in a closed position pinching the animal's neck. One drawback to this automatic "swing" type headgate is that when used with longhorned animals the gates must be preset to an open position too wide to contact the animal's shoulders, and in these instances the animal can pass through the headgate without being captured.

The improved headgate of the present invention provides a solution to the problems enumerated above. The present invention contemplates a headgate with a vertical head movement restraint which is self-tightening and does not interfere with the disengaging action and, further, an animal-tripping automatic headgate for use with longhorned animals.

BRIEF DESCRIPTION OF THE DRAWINGS

The invention will be better understood by reference to the drawings.

FIG. 1 is a pictorial view showing one embodiment of the improved headgate contemplated by this invention with an animal confined therein.

FIG. 2 is a front view showing one embodiment of the improved headgate.

FIG. 3 is a sectional view of the improved headgate taken along the line 3—3 of FIG. 2 in the direction of the arrows.

FIG. 4 is a top view showing the improved automatic headgate of the present invention in the preset position.

FIG. 5 is an enlarged pictorial view of a preferred embodiment of the self-tightening head restraint.

DETAILED DESCRIPTION OF THE INVENTION

Referring to FIGS. 1 and 2, the headgate used to illustrate the invention is designated generally as numeral 10 and is provided with a gate closure and locking mechanism designated generally as 20. Such closure and locking mechanisms are of various mechanical and pneumatic designs well known in the art. The headgate 10 includes a pair of upright support members 12 and 14 and a pair of gate sections 16 and 18. Each gate section is mounted pivotally to one of the support members, and each gate section has an outer, substantially vertical, animal engaging edge 22 and 24, respectively. Edges 22 and 24, when in the closed position, are spaced apart to accommodate an animal's neck but are sufficiently close together to prevent withdrawal of the head. One gate section 18 is mounted to its support member 14 to enable movement in the radial direction; i.e., gate section 18 and its engaging edge 22 can move toward or away from support member 14. Compression spring 26 holds the engaging edge 22 at its outermost position, but when the headgate accommodates an animal with a large neck the springs 26 will yield allowing section 18 and engaging edge 22 to collapse toward the support member 14. This will prevent injury to the animal.

The above-described headgate is one type upon which the head restraint improvement of this invention can be utilized; however, the improvement is not limited to this "swing" type of headgate. The head restraint contemplated by this invention can be used on any headgate which incorporates two generally upright neck engaging members which move together to pinch the neck of the animal to be confined. Many various and diverse types are known in the art. It is necessary, however, that the animal engaging members, when in the closed position, be substantially vertical; i.e., of sufficient vertical alignment to enable the restraining mechanism, described below, to operate efficiently and effectively. The animal engaging members should also converge toward each other at their lower portion below the area where the animal would normally hold its head. Thus the gate sections 16 and 18, as shown in FIG. 2, will substantially close together at their bottom portion to provide a stationary, lower stop below which the animal will be unable to move its neck. Of course, rather than having converging edges, one gate section could be provided with a stationary stop which would perform the same function.

The head restraining improvement of the present invention includes a means for restraining the vertical movement of the head of an animal confined within the engaging edges of the headgate. The restraining means cooperates with the gate sections of the headgate and is positioned with the headgate so that the gate sections and their respective engaging edges can be disengaged from the confined animal without having to remove the restraining means from its engaged position. In other words, the restraining means, when in place, will not interfere with the disengagement of the gate sections, and when the gate sections are disengaged the head restraint will also be disengaged automatically.

The restraining means is movably secured to one of the gate sections of the headgate and, when in use, will move down by force of gravity until it is stopped by the neck of the animal. The restraining means includes a ratchet mechanism which is removably engaged so that upward movement of the restraining means is prevented.

Referring to FIGS. 2 and 5, one embodiment of the invention has been illustrated which includes a carrier member 32, mounted on gate section 16 in such a manner that it can freely slide up and down over an upper portion of the length of gate section 16. Fixedly secured, as by welding, to member 32 is a bolt or stud 38 and a stop 30 which will side with member 32 adjacent to engaging edge 24 as is shown by the arrows in FIG. 5. A ratchet arm 34 is pivotally mounted on gate section 16 at point 40 and includes a plurality of downwardly inclined notches 36 which will engage with the bolt 38. Extension spring 42, secured to the arm 34 and gate section 16, provides the necessary force to hold ratchet arm 34 and notches 36 in an engaged relation with bolt 38 of carrier member 32. Handle 44 provides a means to disengage the ratchet arm 34 and carrier member 32. An upper, lateral notch 46 is provided in arm 34 which cooperates with bolt 38 and holds the restraining means in an upper disengaging position when not in use.

Stop 30 moves adjacent to the engaging edge 24 and is positioned to occupy the space between edges 22 and 24 when the gate is in a closed position, as can be seen in FIGS. 2 and 3. In this position stop 30 serves as a physical restraint to the upward movement of the head of the confined animal. However, stop 30 is only to extend from edge 24 of section 16 a sufficient distance to function properly, and not so far as to interfere with the engaging, locking and disengaging action of gate sections 16 and 18. The stop should be in a substantially planar relationship with the gate sections when closed; i.e., the stop 30 must be sufficiently aligned with closed sections 16 and 18 so as to impede the movement of an animal's neck confined therein. For example, stop 30 could be an extension of the front frame 47 or back frame 48 of carrier member 32 such that it would lie in a plane adjacent to that defined by the closed gate sections.

In the operation of the embodiment of the invention shown in the drawings the headgate 10 is preset to engage an animal which approaches through chute 11. The restraining means is in the disengaged position with bolt 38 in lateral notch 46, maintaining member 32 and stop 30 in their uppermost position. When the animal has entered the headgate and is confined therein and it is desired to restrain the animal's head movement, handle 44 is displaced momentarily toward support member 12, thus pivoting arm 34 about point 40 and releasing the carrier member 32 and stop 30. Carrier member 32 and stop 30, in slidable relation with section 16, move by force of gravity downward until stopped by the back of the animal's neck. If the animal attempts to raise its head, bolt 38 will engage the slanted notches 36 and stop 30 will be held stationary. As the animal lowers its head, the restraining means will continue to lower itself and lock at each successive notch until the animal's head is restrained substantially from any vertical movement.

When the animal is to be set free, the locking and closure mechanism 20 is released and the animal can move the gates either forward or backward and thereby disengage itself from the headgate and restraining means. To reset the restraining means handle 44 is again displaced toward support member 12 and the carrier member 32 along with stop 30 are raised such that bolt 38 again cooperates with notch 46.

Of course, other mechanisms can be employed to effect the vertical movement and self-tightening of the restraining means, and additional mechanisms can be utilized to automate the engaging and releasing actions provided in this embodiment by handle 44.

As previously mentioned, automatic "swing" type headgates have proven ill-adapted for use with long-horned animals. The animal-tripping means contemplated by this invention will enable this automatic headgate to work effectively with such livestock.

The improved, animal-tripping, automatic headgate of this invention includes a triggering means for engaging the upper chest and brisket area of the animal to be confined. The triggering means is detachably secured to the gate sections of the headgate and cooperates with these sections such that when the animal enters the open headgate it will engage the triggering means, causing the gate sections to swing to the closed and locked position thus pinching the animal's neck and confining it with the headgate. The triggering means can be any strong, flexible, cord-like element such as a chain, wire, strap, or cable.

Referring now to FIG. 2 which shows one embodiment of this improved animal-tripping headgate, the support members 12 and 14 are provided with securement means 54 which can be hooks, studs, or notches and by which triggering means 50, in this embodiment shown as a chain, is secured. Of course, one of the securement means can fixedly secure the chain 50 to one of the gate sections as, for example, through welding or bolting. A plurality of pairs of guide means 52 are secured to the lower portion of engaging edges 22 and 24 in a horizontal alignment, and chain 50 is slidably engaged with the guide means 52 so that it bridges the spacing between the gate sections 16 and 18.

In operation this improved automatic headgate is preset in the open position with the gate sections spaced apart enough to accommodate the horns of the animal to be confined, as is shown in FIG. 4. The chain 50 is adjusted on securement means 54 so that it spans the space between the open animal engaging edges 22 and 24 in a substantially horizontal alignment. Chain 50 has also been threaded through an appropriate pair of guide means 52 so that it will be at a proper height to engage the brisket area of whatever type of animal is to be confined.

As the animal enters the headgate its horns will pass the engaging edges 22 and 24, and it will engage the chain 50. When the animal attempts to pass through the gate it will pull the chain 50 which in turn will swing gate sections 16 and 18 into their closed position pinching the animal's neck. When the animal is to be released in the forward direction it is of course necessary to detach chain 50 from the securement means such that, as the section gates swing open the chain 50 will unthread.

An alternative embodiment of the animal-tripping improvement of this invention utilizes only a triggering means and securement means, as shown in FIG. 4. According to this embodiment a plurality of pairs of the securement means are fixedly attached directly to engaging edges 22 and 24 in substantially horizontal alignment. The triggering means is detachably secured to an appropriate pair of securement means so as to be a proper height to engage the brisket of whatever animal is to be confined. This embodiment operates in a manner like that embodiment described above and shown in FIG. 2.

It should be understood that various modifications of the preferred embodiments of this improved headgate as discussed herein can be made without departing from the spirit and scope of the invention. For example, the restraining means can consist of two sections, or half members, each half-member cooperating with one gate section and including a half-stop, which together restrain the vertical movement of the confined animal's head.

I claim:

1. In a livestock headgate including a pair of upright support members and a pair of gate sections, each gate section pivotally mounted to one of the support members and having a substantially vertical, outer, animal engaging edge, whereby a confined animal's neck may be secured between said edges when said gate sections are in a closed position, the improvement comprising: means cooperating with said gate sections for restraining the vertical movement of the confined animal's head, and self-tightening means for positioning said restraining means at different levels, said self-tightening means also including means for locking said restraining means at any one of said levels whereby said restraining means can only move into further restraining position to minimize the vertical movement of the confined animal's head.

2. The improvement of claim 1 wherein said self-tightening means is a removably engagable ratchet means.

3. The improvement of claim 1 wherein said restraining means cooperates with one of said gate sections and is positioned therewith such that both said gate sections are freely movable to disengage the confined animal with said restraining means maintained in a restraining position.

4. A livestock headgate comprising a pair of upright support members; a pair of gate sections, each gate section being pivotally mounted to one support member and each section having a substantially vertical, outer, animal engaging edge, whereby an animal's neck may be secured between said edges when said gate sections are in a closed position; a self-adjusting head restraining means including a carrier member slidably secured to one of the gate sections, a stop fixedly secured to said carrier member, said carrier member and said stop being vertically movable, with said stop adjacent to the engaging edge of the one gate section and disposed between both of said gate sections when said sections are in the closed position; and a ratchet means pivotally mounted to the one gate section and removably engageable with said carrier member to allow only downward movement of said carrier member and said stop while said ratchet is engaged; and said head restraining means also being positioned to allow the gate sections to freely pivot on their respective support members without restriction.

5. An animal-engaging livestock headgate comprising a pair of upright support members; a pair of gate sections, each gate section being pivotally mounted to one of the support members and each gate section having an outer, animal-engaging edge, whereby an animal's neck may be secured between said edges when said gate sections are in a closed position; and means for automatically tripping the pair of gate sections to the closed position, said tripping means cooperating with said animal engaging edges and engaging the chest and brisket portions of the animal as it enters the headgate, said tripping means also including an elongated triggering means for bridging the space between said engaging edges when said headgate is in a preset, open position, and means for adjusting the vertical placement of said triggering means.

6. The improved headgate set forth in claim 5 wherein said triggering means is secured at each end to said engaging edges, and with at least one of said ends detachably secured to said engaging edge.

7. An apparatus for the handling of livestock comprising: a pair of upright support members; a pair of gate sections, each pivotally mounted to one of said support members and each having a substantially vertical, outer, animal engaging edge whereby an animal's neck may be secured between said edges when said gate sections are in a closed position; a means for restraining the vertical head movement of an animal confined within the headgate, said restraining means cooperating with one of said gate sections and positioned thereon such that both said gate sections are freely movable to disengage a confined animal with said restraining means maintained in restraining position, said restraining means also including self-tightening means for multi-level positioning and means for locking said restraining means at each said level whereby said restraining means can only move into further restraining position; and means for automatically tripping said pair of gate sections to the closed position, said tripping means cooperating with a lower portion of said animal engaging edges and engaging the chest and brisket portions of the animal as it enters the headgate.

* * * * *